United States Patent
Tsukane et al.

(10) Patent No.: US 8,440,317 B2
(45) Date of Patent: May 14, 2013

(54) PROTECTIVE FILM FOR POLARIZING MEMBRANE AND POLARIZING LAMINATE

(75) Inventors: Nagayoshi Tsukane, Kawachinagano (JP); Tatsuo Izumitani, Himeji (JP)

(73) Assignee: Daicel Chemical Industries, Ltd., Osaka-shi (JP)

( * ) Notice: Subject to any disclaimer, the term of this patent is extended or adjusted under 35 U.S.C. 154(b) by 933 days.

(21) Appl. No.: 11/664,723

(22) PCT Filed: Oct. 3, 2005

(86) PCT No.: PCT/JP2005/018272
§ 371 (c)(1),
(2), (4) Date: Apr. 5, 2007

(87) PCT Pub. No.: WO2006/040954
PCT Pub. Date: Apr. 20, 2006

(65) Prior Publication Data
US 2008/0094707 A1    Apr. 24, 2008

(30) Foreign Application Priority Data

Oct. 8, 2004    (JP) ................................ 2004-296292

(51) Int. Cl.
*B32B 27/34* (2006.01)
*C08J 5/18* (2006.01)
*G02C 7/12* (2006.01)

(52) U.S. Cl.
USPC ..................... 428/474.4; 428/476.3; 528/346; 351/49

(58) Field of Classification Search .................. 528/346; 428/474.4, 476.3
See application file for complete search history.

(56) References Cited

U.S. PATENT DOCUMENTS

| | | | | |
|---|---|---|---|---|
| 2,130,948 A * | 9/1938 | Carothers | ................. | 15/159.1 |
| 2,285,792 A * | 6/1942 | Bailey | ................. | 359/494 |
| 2,547,799 A * | 4/1951 | Wernig | ................. | 296/96.21 |
| 2,604,817 A * | 7/1952 | Schupp, Jr. | ................. | 359/500 |
| 2,817,559 A * | 12/1957 | Nickles | ................. | 296/96.12 |
| 4,461,886 A * | 7/1984 | Rogers et al. | ................. | 528/331 |
| 6,204,355 B1 * | 3/2001 | Dalla Torre et al. | ................. | 528/310 |
| 6,797,383 B2 * | 9/2004 | Nishizawa et al. | ................. | 428/412 |
| 6,808,665 B1 * | 10/2004 | Percival | ................. | 264/130 |
| 6,814,902 B2 * | 11/2004 | Yamamoto et al. | ................. | 264/1.7 |
| 2002/0036359 A1 | 3/2002 | Yamamoto et al. | | |
| 2003/0072078 A1 | 4/2003 | Higashio et al. | | |
| 2003/0214059 A1 | 11/2003 | Itoh | | |

FOREIGN PATENT DOCUMENTS

| | | |
|---|---|---|
| EP | 0 837 087 A1 | 4/1998 |
| EP | 1 193 044 A2 | 4/2002 |
| JP | 57-062011 | 4/1982 |
| JP | 60-257403 A | 12/1985 |
| JP | 9-5683 A | 1/1997 |
| JP | 09005683 A * | 1/1997 |
| JP | 2838514 B2 | 10/1998 |
| JP | 2001-305341 A | 10/2001 |
| JP | 2002-103462 A | 4/2002 |
| JP | 2002-189199 A | 7/2002 |

OTHER PUBLICATIONS

Trogamid CX Informational Brochure; Evonik Degussa Gmbh, on the web at: http://www.trogamid.com/d1/brochure/trogamid_cx_optics_eng.pdf.*

Song et al, Polycarbonate films in the state of high global chain orientation but nearly random segmental orientation, European Polymer Journal, 36 (2000), 1463-1470.*

Supplementary European Search Report issued in European Patent Application No. 05 78 7512 on Apr. 28, 2010.

Extended European Search Report issued Mar. 25, 2013, in European Patent Application No. 12008263.1.

* cited by examiner

*Primary Examiner* — Randy Gulakowski
*Assistant Examiner* — Rachel Kahn
(74) *Attorney, Agent, or Firm* — Birch, Stewart, Kolasch & Birch, LLP

(57) ABSTRACT

A protective film for a polarizing membrane is provided which is prevented in light leakage generation, and excellent in moldability. The protective film contains a polyamide resin, and is subjected to an orientation (e.g., a drawing) to have a retardation value of not less than 300 nm. The polyamide resin may also contain an alicyclic polyamide resin, e.g., a resin whose monomers are an alicyclic diamine and an aliphatic dicarboxylic acid. The polyamide resin may have microcrystallinity. The Abbe number of the polyamide resin may be not less than 40.

8 Claims, No Drawings

PROTECTIVE FILM FOR POLARIZING MEMBRANE AND POLARIZING LAMINATE

TECHNICAL FIELD

The present invention relates to a protective film for a polarizing membrane, in which irregular color is not generated, light leakage generation or development is prevented or inhibited even in the case of being subjected to a bending, and moldability is excellent; and relates to a polarizing laminate (a polarizing sheet) comprising the protective film.

BACKGROUND ART

A polarizing plate used for glasses (or spectacles), sunglasses, goggles and others comprises a polarizing membrane (or film) and a protective film for the polarizing membrane. For the protective film in recent years, the requirements for the properties (or characteristics) such as optical properties, mechanical properties and chemical resistance have been strict. Moreover, with respect to the recent glasses and the like, the requirement not only for practical functions but also for fashionability with an aesthetic value (e.g., frameless glasses) has been strong.

Thereat, protective films for a polarizing membrane with various excellent properties have been developed. For example, Japanese Patent Application Laid-Open No. 305341/2001 (JP-2001-305341A, Patent Document 1) discloses a polarizing plate comprising a polarizing membrane and polycarbonate resin (PC) sheet(s) laminated on one side or both sides thereof as a protective film for the polarizing membrane. This document mentions that the protective film has a retardation value (Δn·d) of not more than 300 nm, which is defined as a product of a birefringence index (Δn) and a thickness (d), and the protective film ensures a sufficient polarization degree without generating a degree in the case of forming the protective film into a curved surface form such as a spherical surface and without generating a crack on the PC sheet.

However, since the polycarbonate resin has a high dispersibility (a low Abbe number), the protective film generates light chromatic dispersion resulting in light blurring, and tends to generate chromatic aberration when the protective film is observed from an oblique angle. Moreover, in the case of punching a hole or forming a tapped hole in the polarizing plate for preparing frameless glasses or sunglasses, the protective film comprising the polycarbonate resin sometimes generates a fracture or a crack around the hole and has photoelasticity. Therefore, it is impossible to certainly impart a high moldability to the protective film. Further, the document describes that the protective film is excellent in solvent resistance, and that, in the case of pasting the polarizing membrane and the polycarbonate resin sheet with an adhesive, the protective film can prevent or inhibit generation of a crack on the sheet. However, a frame for glasses or the like is formed from aplastic resin containing a plasticizer (e.g., a cellulose acetate) in many cases. There is a possibility that such a plasticizer bleeds out and moves to the polarizing plate to generate a crack on the protective film comprising the polycarbonate resin.

Japanese Patent Publication No. 2838514 (JP-2838514B, Patent Document 2) discloses a polarizing plate comprising a polarizing membrane and polycarbonate resin sheet(s) laminated on one side or both sides thereof as a protective film for the polarizing membrane, as is the case with Patent Document 1. The protective film has a retardation value (Δn·d) of 3000 to 6000 nm. This document mentions that, by increasing the retardation value in the protective film, it is hard to generate chromatic aberration developed in the case of bending the protective film into a lens form. However, in the protective film described in this document, it is difficult to sufficiently inhibit or prevent development of irregular color in a bending. In addition, the protective film is deteriorated in solvent resistance so that the film is sometimes corroded by a solvent for an adhesive.

As described above, a conventional protective film for a polarizing membrane has had problems such as a light leakage phenomenon or irregular color development generated in a bending, crack development due to insufficient solvent resistance, and turbidity.

On the other hand, Japanese Patent Application Laid-Open No. 189199/2002 (JP-2002-189199A, Patent Document 3) discloses a polarizing molded article comprising a polarizing plate-containing laminated structure in which a polarizer sheet layer is held between two protective sheet layers, wherein one layer of the protective sheet layer and a polyurethane sheet layer or a polyamide sheet layer are connected with an adhesive or a pressure sensitive adhesive, and the polyurethane sheet layer or the polyamide resin sheet layer and a thermally molding resin layer are thermally adhered. This document also mentions that the polyamide sheet layer is a transparent polyamide sheet and that the resin constituting the thermally molding resin layer is a polyamide (e.g., a transparent polyamide), a thermoplastic polyurethane, or a polycarbonate. Incidentally, in this document, there is no description about a light leakage phenomenon or irregular color.

Moreover, Japanese Patent Application Laid-Open No. 257403/1985 (JP-60-257403A, Patent Document 4) discloses a polarizing plate comprising a polarizing film, and an oriented film which is drawn to one direction parallel to a film surface thereof so as to satisfy a specific relationship in refractive index and which is bonded to at least one side of the polarizing film through an adhesive layer, and discloses that the oriented film is selected from the group consisting of a polysulfone film, a polycarbonate film, a polyamide film, and a polyether sulfone film. The examples of the document mentions that a uniaxially oriented polycarbonate film having a thickness of 100 μm with a specific relationship in refractive index was produced by heating an unoriented polycarbonate film having a thickness of 300 μm to 130° C., and three-fold drawing the film to one direction (Y direction). Moreover, this document describes that a polarizing plate which generates no colored interference fringe [irregular color caused by optical anisotropy (birefringence index) due to a drawing process] is obtained by using such a film satisfying a specific refractive index alone or using two films which are arranged so that these optical axes are set in perpendicular to each other. Incidentally, also in this document, there is no description about a light leakage phenomenon.

[Patent Document 1] JP-2001-305341A (Claims, and Paragraph numbers [0012] and [0014])
[Patent Document 2] JP-2838514B (Claims, and Paragraph numbers [0005] and [0006])
[Patent Document 3] JP-2002-189199A (Claims)
[Patent Document 4] JP-60-257403A (Claims, Examples, the upper left column of page 2, and the lower left column of page 5)

DISCLOSURE OF THE INVENTION

Problems to be Solved by the Invention

It is therefore an object of the present invention to provide a protective film for a polarizing membrane, in which not only irregular color is not generated but also light leakage can be prevented (or inhibited) even in the case of being subjected to a bending (for example, a curved surface processing, particularly, a bending by thermoforming), and which is excellent in moldability.

Another object of the present invention is to provide a method for efficiently preventing (or inhibiting) generation of light leakage (and irregular color development) of a protective film for a polarizing membrane comprising a polyamide resin.

It is still another object of the present invention to provide a polarizing sheet for a polarizing membrane, in which has light leakage and irregular color are not generated or developed even in the case of being subjected to a bending, and which is excellent in moldability, mechanical properties or chemical resistance.

Means to Solve the Problems

The inventors of the present invention have discovered that in the case where a protective film for a polarizing membrane comprises a polyamide resin, irregular odor (chromatic aberration) can be prevented in the protective film without increasing a retardation value. In instances where irregular color is observed in a protective film comprising a polycarbonate resin, light leakage or a light leakage phenomenon of the protective film is generated by a curved surface processing (in particular, a curved surface processing with a thermoforming method). Specifically, a light leakage phenomenon is brightly generated in the form of a four-leafed clover in the case of putting a molded article that is subjected to a curved surface processing or a bending between two polarizing laminates (polarizing plates) with planes of polarization perpendicular to each other, and observing the light leakage of a transmitted light (so-called crossed nicols observation). Such a light leakage phenomenon is generated in the case where the protective film for a polarizing membrane (after being subjected to the bending) has a predetermined retardation value (for example, about 150 to 400 nm).

Specifically, the inventors of the present invention made intensive studies to achieve the above objects and finally found that a protective film for a polarizing membrane, comprising a polyamide resin and having a retardation value of not less than a predetermined value can be prevented (or inhibited) in light leakage generation and irregular color development even in the case of being subjected to a bending, and is excellent in moldability. The present invention has been accomplished based on the above findings.

That is, the protective film for a polarizing membrane of the present invention is a protective film comprising a polyamide resin. The protective film has a retardation value of not less than 300 nm. The polyamide resin may comprise an alicyclic polyamide resin. The alicyclic polyamide resin may comprise an alicyclic polyamide resin, and monomers of the alicyclic polyamide resin may comprise an alicyclic diamine and an aliphatic dicarboxylic acid. Moreover, the polyamide resin may comprise a microcrystalline polyamide resin. Further, the polyamide resin constituting the protective film of the present invention may have an Abbe number of, for example, not less than 40 (e.g., about 40 to 60). The representative polyamide resin may include, for example, an alicyclic polyamide resin having an Abbe number of 40 to 60, where monomers of the alicyclic polyamide resin comprise a bis(amino$C_{5-10}$cycloalkyl)$C_{1-6}$alkane and a $C_{4-18}$alkanedicarboxylic acid. It is sufficient that the retardation value of the protective film is not less than 300 nm. In particular, the retardation value may be about 300 to 4800 nm.

The protective film of the present invention may be produced by, for example, subjecting a film (or a film-like material) comprising a polyamide resin to an orientation. That is, a protective film for a polarizing membrane in which light leakage generation is inhibited or prevented may be obtained by subjecting a film comprising the polyamide resin to an orientation so that the retardation value of the film is not overlapped with the above-mentioned predetermined retardation range. In such a production process, for example, a molten film comprising the polyamide resin may be subjected to a uniaxially drawing at a predetermined draw ratio (e.g., a draw ratio of about 1.05 to 2.8).

In the present invention, as mentioned above, combination of a polyamide resin and a retardation value of not less than 300 nm ensures efficient prevention or inhibition of generation (or formation) of light leakage (and development of irregular color). Therefore, the present invention also include, for example, a method for preventing or inhibiting generation of light leakage (and development or generation of irregular color) of a protective film for a polarizing membrane (or a polarizing sheet) [specifically, light leakage (and irregular color) generated in the protective film or polarizing sheet], which comprises providing a protective film for a polarizing membrane comprising a polyamide resin, and adjusting a retardation value of the film to not less than 300 nm.

Further, the present invention includes a polarizing sheet (or a polarizing sheet layer) comprising a polarizing membrane, and the protective film which is laminated on at least one side (usually, both sides) of the polarizing membrane. Such a polarizing sheet may be usually a curved sheet (or may have a curved surface). In such a curved polarizing sheet (or a sheet having a curved surface), the protective film may be curved corresponding to the curved surface of the polarizing sheet and have a retardation value of not less than 400 nm.

The curved polarizing sheet may be produced by, for example, laminating the protective film on at least one side of a polarizing membrane, and bending the laminate (particularly, bending the laminate with a thermoforming).

Incidentally, throughout the specification, unless otherwise indicated, the phrase "protective film for a polarizing membrane" means a non-curved film (a film which is not subjected to a bending).

Effects of the Invention

Since the protective film for a polarizing membrane of the present invention comprises a polyamide resin and has a specific retardation value, the protective film not only has no irregular color development but also can be prevented (or inhibited) in light leakage Even in the case of being subjected to a bending (e.g., a curved surface processing, particularly, a bending with a thermoforming), the protective film is excellent in moldability. Moreover, in the present invention, light leakage (and irregular color development) generated in a protective film for a polarizing membrane, comprising a polyamide resin can be efficiently prevented (or inhibited) by a combination of a polyamide resin and a specific retardation value. Further, in the polarizing sheet of the present invention, light leakage and irregular color are not generated or developed even in the case of being subjected to a bending. In addition, since the protective film comprises a polyamide resin (in particular, an alicyclic polyamide resin), the polarizing sheet is excellent in moldability, mechanical properties or chemical resistance.

DETAILED DESCRIPTION OF THE INVENTION

[Protective Film for Polarizing Membrane]

The protective film for a polarizing membrane of the present invention (hereinafter, sometimes simply referred to as a protective film) comprises a polyamide resin, and has a retardation value of not less than 300 nm.

The polyamide resin may include an aliphatic polyamide resin (an aliphatic polyamide), an alicyclic polyamide resin (an alicyclic polyamide), an aromatic polyamide resin (an aromatic polyamide), and others. The polyamide resin may be a homopolyamide or a copolyamide.

The aliphatic polyamide may include a homopolyamide, for example, a condensation product of an aliphatic diamine component (e.g., a $C_{4-14}$alkylenediamine such as tetramethylenediamine, hexamethylenediamine or dodecanediamine) and an aliphatic dicarboxylic acid component (e.g., a $C_{6-14}$alkanedicarboxylic acid such as adipic acid, sebacic acid or dodecanedioic acid) (for example, a polyamide 46, a polyamide 66, a polyamide 610, a polyamide 612, and a polyamide 1010), and a homopolyamide of a lactam (e.g., a lactam having carbon atoms of about 4 to 16, such as ε-caprolactam or ω-laurolactam) or an aminocarboxylic acid (e.g., an aminocarboxylic acid having carbon atoms of about 4 to 16, such as ε-aminoundecanoic acid) (for example, a polyamide 6, a polyamide 11, and a polyamide 12); a copolyamide, for example, a copolyamide which is a copolymer of monomeric components constituting a polyamide (e.g., the above-mentioned aliphatic diamine component, aliphatic dicarboxylic acid component, lactam and aminocarboxylic acid), e.g., a copolymer of 6-aminocaproic acid and 12-aminododecanoic acid; a copolymer of 6-aminocaproic acid, 12-aminododecanoic acid, hexamethylenediamine and adipic acid; a polyamide 6/11, a polyamide 6/12, a polyamide 66/11, a polyamide 66/12, and others.

The alicyclic polyamide may include a homo- or copolyamide obtained from at least one constituent component (or monomer) selected from the group consisting of an alicyclic diamine and an alicyclic dicarboxylic acid, and others. The alicyclic diamine may include a diamino$C_{5-10}$cycloalkane such as diaminocyclohexane; a bis(amino$C_{5-10}$cycloalkyl)$C_{1-6}$alkane such as bis(4-aminocyclohexyl)methane, bis(4-amino-3-methylcyclohexyl)methane or 2,2-bis(4'-aminocyclohexyl)propane; and others. The alicyclic diamine may have a substituent such as an alkyl group (e.g., a $C_{1-6}$alkyl group such as methyl group or ethyl group, preferably a $C_{1-4}$alkyl group, and more preferably a $C_{1-2}$alkyl group). Moreover, the alicyclic dicarboxylic acid may include a $C_{5-10}$cycloalkanedicarboxylic acid such as cyclohexane-1,4-dicarboxylic acid or cyclohexane-1,3-dicarboxylic acid, and others.

The alicyclic polyamide may be a resin obtainable from constituent components such as an aliphatic diamine (e.g., a $C_{4-14}$alkylenediamine such as tetramethylenediamine, hexamethylenediamine or dodecanediamine) and/or an aliphatic dicarboxylic acid (e.g., a $C_{4-18}$alkanedicarboxylic acid such as adipic acid, sebacic acid or dodecanedioic acid) together with an alicyclic diamine and/or an alicyclic dicarboxylic acid as the diamine component and the dicarboxylic acid component.

As the preferred alicyclic polyamide, for example, there is mentioned a resin (homo- or copolyamide) obtainable from an alicyclic diamine [e.g., a bis(amino$C_{5-10}$cycloalkyl)$C_{1-6}$alkane, preferably a bis(amino$C_{6-8}$cycloalkyl) $C_{1-6}$alkane, and more preferably a bis(aminocyclohexyl) $C_{1-3}$alkane] and an aliphatic dicarboxylic acid (e.g., a $C_{4-18}$alkanedicarboxylic acid, preferably a $C_{6-16}$alkanedicarboxylic acid, and more preferably a $C_{8-14}$alkanedicarboxylic acid) as constituent components. The representative alicyclic polyamide resin (an alicyclic polyamide resin obtainable from an alicyclic diamine and an aliphatic dicarboxylic acid) includes an alicyclic polyamide represented by the following formula (1), and others.

[Formula 1]

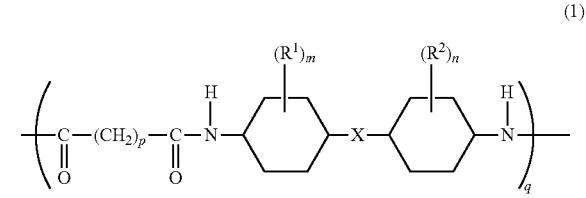

In the formula, X represents a direct bond, an alkylene group or an alkenylene group, $R^1$ and $R^2$ are the same or different and each represents an alkyl group, "m" and "n" denotes 0 or an integer of 1 to 4, "p" and "q" denotes an integer of not less than 1.

In the above-mentioned formula (1), the alkylene group (or alkylidene group) represented by the group X may include a $C_{1-6}$alkylene group (or alkylidene group) such as methylene, ethylene, ethylidene, propylene, propane-1,3-diyl, 2-propylidene or butylene, preferably a $C_{1-4}$alkylene group (or alkylidene group), and more preferably a $C_{1-3}$alkylene group (or alkylidene group). Moreover, the alkenylene group represented by the group X may include a $C_{2-6}$alkenylene group such as vinylene or propenylene, preferably a $C_{2-4}$alkenylene group, and others.

In the substituents $R^1$ and $R^2$, the alkyl group may include, for example, a $C_{1-6}$alkyl group such as methyl, ethyl, propyl, isopropyl or butyl group, preferably a $C_{1-4}$alkyl group, and more preferably a $C_{1-2}$alkyl group (e.g., methyl group, and ethyl group).

The numbers "m" and "n" of the substituents $R^1$ and $R^2$ may be selected from 0 or an integer of 1 to 4, respectively. These numbers may be usually 0 or an integer of 1 to 3, preferably 0 or an integer of 1 to 2, and more preferably 0 or 1, respectively. Moreover, the positions of the substituents $R^1$ and $R^2$ may be usually selected from 2-position, 3-position, 5-position and 6-position with respect to the amide group, respectively, and may be preferably 2-position or 6-position, respectively.

In the formula (1), "p" may be, for example, not less than 4 (e.g., about 4 to 30), preferably not less than 6 (e.g., about 6 to 20), and more preferably not less than 8 (e.g., about 8 to 15). Moreover, in the formula (1) "q" (the degree of polymerization) may be, for example, not less than 5 (e.g., about 10 to 1000), preferably not less than 10 (e.g., about 30 to 800), and more preferably not less than 50 (e.g., about 100 to 500).

Incidentally, the alicyclic polyamide has a high transparency, and is known as a so-called transparent polyamide. The above-mentioned alicyclic polyamide resin can be also available as, for example, TROGAMID™ from Daicel-Degussa Ltd. (an alicyclic polyamide resin), GRILAMID™ from EMS-Chemie Holdings AG (an alicyclic polyamide resin), and others. The alicyclic polyamide resins may be used singly or in combination.

The aromatic polyamide may include a polyamide in which at least one component of the diamine component (for example, an aliphatic diamine, e.g., a $C_{4-14}$alkylenediamine such as tetramethylenediamine, hexamethylenediamine or dodecanediamine) and the dicarboxylic acid component (for example, an aliphatic dicarboxylic acid, e.g., a $C_{4-14}$ alkanedicarboxylic acid such as adipic acid, sebacic acid or dodecanedioic acid) is an aromatic component, for example, a polyamide in which the diamine component is an aromatic component [for example, a condensation product of an aromatic diamine such as MXD-6 (e.g., metaxylylenediamine) and an aliphatic dicarboxylic acid], and a polyamide in which the dicarboxylic acid component is an aromatic component [for example, a condensation product of an aliphatic diamine (e.g., trimethylhexamethylenediamine) and an aromatic dicarboxylic acid (e.g., terephthalic acid, and isophthalic acid)].

As the above-mentioned polyamide resin may be used a homo- or copolyamide containing dimer acid as a dicarboxylic acid component, a polyamide having a branched structure introduced by using a small amount of a polyfunctional polyamine and/or polycarboxylic acid component, a modified polyamide (e.g., an N-alkoxymethylpolyamide), and others. Further, as usage, the polyamide resin may be a thermoplastic elastomer.

These polyamide resins may be used singly or in combination.

Among the above-described various polyamides, the preferred polyamide resin which is suitable for the protective film includes an alicyclic polyamide resin.

The number average molecular weight of the polyamide resin may be, for example, about 6,000 to 300,000, preferably about 10,000 to 200,000, and more preferably about 20,000 to 200,000.

The polyamide resin may be either amorphous or crystalline as long as the transparency is secured. In particular, the polyamide resin may be a polyamide resin having microcrystallinity (e.g., a polyamide resin having a degree of crystallinity of about 1 to 20%, preferably about 1 to 10%, and more preferably about 1 to 8%), for example, the above-mentioned alicyclic polyamide resin such as an alicyclic polyamide represented by the formula (1). The degree of crystallinity may be determined by a conventional thermal analysis (a differential scanning calorimeter), that is, determined based on a melting heat quantity calculated from the endoergic peak area (S) of the polyamide resin. The melting heat quantity may be, for example, not more than 30 J/g (e.g., about 1 to 30 J/g), preferably not more than 20 J/g (e.g., about 2 to 20 J/g), and more preferably not more than 17 J/g (about 3 to 17 J/g).

The polyamide resin may have a thermal, melting temperature (or melting temperature). The thermal melting temperature (Tm) may be, for example, about 100 to 300° C., preferably about 110 to 280° C., and more preferably about 130 to 260° C. In particular, the thermal melting temperature (Tm) of the polyamide resin having crystallinity (particularly, microcrystallinity) may be, for example, about 150 to 300° C., preferably about 180 to 280° C., and more preferably about 210 to 260° C.

The polyamide resin has a high Abbe number compared with a polycarbonate resin or others in many cases. In particular, a protective film comprising a polyamide resin having a high Abbe number can be efficiently prevented in generation of chromatic aberration. Therefore, the Abbe number of the polyamide resin may be selected from the range of not less than 30 (e.g., about 32 to 65) and usually not less than 35 (e.g., about 35 to 65). The Abbe number may be, for example, not less than 40 (e.g., about 40 to 60), preferably not less than 42 (e.g., about 42 to 58), and more preferably not less than 44 (e.g., about 44 to 55).

The polyamide resin may contain various additives, for example, a stabilizer (e.g., a heat stabilizer, an ultraviolet ray absorbing agent, and an antioxidant), a plasticizer, a lubricant, a filler, a coloring agent, a flame retardant, and an antistatic agent.

As described above, probably because the protective film of the present invention has a high Abbe number compared with a polycarbonate resin or others, the protective film does not usually generate chromatic aberration (or the protective film can be inhibited or prevented in generation of chromatic aberration at a high level) even in the case of not enlarging the retardation value. However, the protective film (or polarizing laminate) comprising the polyamide resin usually develops light leakage in the case of being subjected to a bending (a curved surface processing). In particular, such a light leakage development often becomes noticeable in the case of being subjected to a curved surface processing with a thermoforming.

Therefore, in the present invention, the light leakage generation of the protective film is prevented or inhibited by making a retardation value thereof high, that is, not less than 300 nm. The retardation value of the protective film may be selected from the range of not less than 300 nm (e.g., about 320 to 20000 nm). The retardation value may be usually not less than 350 nm (e.g., about 370 to 15000 nm), for example, not less than 400 nm (e.g., about 420 to 10000 nm), preferably not less than 450 nm (e.g., about 470 to 7000 nm), more preferably not less than 500 nm (e.g., about 520 to 6000 nm), particularly not less than 550 nm (e.g., about 570 to 5000 nm), and usually about 400 to 6000 nm (e.g., about 400 to 5000 nm).

In particular, from the viewpoint of moldability (e.g., bending processability) or others, the retardation value of the protective film may be, for example, not more than 5000 nm (e.g., about 300 to 4800 nm), preferably not more than 4500 nm (e.g., about 350 to 4200 nm), more preferably not more than 4000 nm (e.g., about 400 to 3500 nm), particularly not more than 3000 nm (e.g., about 500 to 2500 nm), and usually not more than 2000 nm (e.g., about 600 to 1500 nm, and preferably about 800 to 1300 nm).

Incidentally, the retardation value of the protective film may be selected from the range of not less than 1300 nm (e.g., about 1300 to 20000 nm). The retardation value may be usually not less than 1500 nm (e.g., about 1600 to 15000 nm), for example, not less than 1800 nm (e.g., about 1900 to 10000 nm), preferably not less than 2000 nm (e.g., about 2100 to 7000 nm), more preferably not less than 2200 nm (e.g., about 2300 to 6000 nm), and particularly not less than 2500 nm (e.g., about 3000 to 5000 nm). The above-mentioned protective film having a relatively large retardation value can be effectively produced without adjusting the draw ratio precisely.

In the protective film having a retardation value as described above, the light leakage generation can be prevented even in the case of being subjected to a bending. Incidentally, it is sufficient that the protective film of the present invention is a film capable of at least inhibiting or preventing light leakage generation after the bending. Before the bending, light leakage of the film may be generated.

That is, the light leakage phenomenon generated in the protective film is developed in the case where the retardation value of the film becomes a predetermined value (for example, about 150 to 400 nm). The retardation value is enlarged or increased along with a bending as described later. Therefore, the protective film may be a film in which the retardation value is beyond the range of such a predetermined retardation value after the bending. Specifically, the protective film of the present invention (a film which is not subjected to a bending) may be a film in which the total of the retardation value of the film and the retardation value increased by a bending of the film is beyond the above-mentioned predetermined retardation value at which the light leakage phenomenon is developed.

Incidentally, the retardation value may be, for example, defined as the product ($\Delta n \cdot d$) of a difference ($\Delta n$) in refractive index between a drawn direction and a direction perpendicular thereto, and a thickness (d).

[Production Process of Protective Film for Polarizing Membrane]

The production process of the protective film of the present invention is not particularly limited to a specific one as far as the above-mentioned predetermined retardation value can be imparted to the film. The protective film of the present invention may be usually produced by subjecting a film comprising a polyamide resin (or a film-like material, e.g., a molten film) molded by a variety of molding processes to an orientation (that is, by orienting the film).

The molding process of the film is not particularly limited to a specific one, and may usually include a melt extrusion molding, a solution casting, and others. In the melt extrusion molding, the film may be produced by, for example, melt-mixing the polyamide resin with an extruder or other means, extrusion molding the mixture from a die (e.g., a T-die), and cooling the extruded matter. From the viewpoint of film productivity, the melt extrusion molding is preferred. The resin temperature for melting and molding (melt-molding) the polyamide resin may be usually selected from the temperature range of about 120 to 350° C.

The thickness of the film to be oriented is not particularly limited to a specific one, and may be selected from the range of about 0.05 to 5 mm. The thickness may be, for example, about 0.1 to 3.0 mm.

The orientation of the film may be conducted by a conventional method, for example, drawing, stretching (or orientating), and others. For example, in a solvent cast, the film may be oriented by drawing (or stretching) a pre-dried film containing a solvent. Moreover, in a melt casting, the protective film may be obtained by subjecting a molten film comprising the polyamide resin to an orientation (e.g., a drawing), for example, a process which comprises cooling a molten film with the use of a cooling means such as a cooling roll with drawing (or stretching) the molten film extruded from a die of an extruder, a process which comprises cooling a molten film extruded from a die and drawing (or stretching) the molten film at a predetermined drawing (or stretching) temperature (a temperature which is not lower than a glass transition temperature and is lower than a melting temperature). From the viewpoint of film productivity, the melt casting, in particular, a melt casting by extrusion, is preferred. Moreover, it is sufficient that the film is oriented to at least one direction (a longitudinal or machine direction MD, or a transverse direction TD). The film may be oriented to intersecting or perpendicular directions. The orientation of the film is usually given by drawing (or stretching) in many cases. For example, the film may be a uniaxially oriented or biaxially oriented film (in particular, a uniaxially oriented film).

The degree of orientation (draw ratio) of the film may be selected according to the retardation value. The degree of orientation may be about 1.05 to 5 (e.g., about 1.1 to 4), preferably about 1.2 to 3.5, more preferably about 1.3 to 2.8 and particularly about 1.4 to 2.8 (e.g., about 1.4 to 2.6) in at least one direction [for example, one direction (e.g., a machine direction)]. From the viewpoint of bending processability, the degree of orientation may be usually not more than 3 (e.g., about 1.05 to 2.8, preferably about 1.1 to 2.6, more preferably about 1.15 to 2, and particularly about 1.15 to 1.8).

In the case of drawing the film at such a degree of orientation as described above, a polarizing sheet can be efficiently obtained without deterioration of moldability (in particular, bending processability). Incidentally, the degree of orientation also depends on the film thickness as described above. For example, in the case where the film thickness is about 0.4 to 1.0 min, the draw ratio may be about 1.1 to 3. Moreover, in a biaxially oriented film, the draw ratio may be about 1.1 to 3 (preferably about 1.2 to 3.0, more preferably about 1.3 to 3.0, and particularly about 1.4 to 2.5) in one direction (e.g., a MD direction), and about 1.1 to 3 (preferably about 1.2 to 3.0, more preferably about 1.3 to 3.0, and particularly about 1.4 to 2.5) in the other direction (e.g., a TD direction).

The drawing temperature may be adjusted depending on the glass transition temperature of the polyamide resin. For example, the drawing temperature may be not lower than 80° C. (e.g., about 80 to 210° C.), preferably not lower than 110° C. (e.g., about 110 to 200° C.), and more preferably not lower than 115° C. (e.g., about 115 to 130° C.).

Incidentally, the orientation of the film may be carried out by either a gradual process (off-line molding) which comprises winding a molten film and then drawing the molten film at a predetermined drawing temperature, or a continuous process (in-line molding) which comprises drawing a molten film at a predetermined drawing temperature without winding the molten film.

The thickness of the protective film may be selected depending on the application, and is not particularly limited to a specific one. The thickness may be, for example, about 20 to 1000 μm, preferably about 30 to 800 μm (e.g., about 40 to 600 μm), and more preferably about 50 to 500 μm (e.g., about 100 to 300 μm).

[Polarizing Sheet and Polarizing Laminate]

The polarizing sheet (or polarizing sheet layer or polarizing plate) of the present invention may usually comprise a polarizing membrane (or polarizing layer) and the above-mentioned protective film laminated on at least one side (particularly, both sides) of the polarizing membrane.

The polarizing membrane is not particularly limited to a specific one. For example, the polarizing membrane may include a polyvinyl alcohol-series polarizing membrane. The polyvinyl alcohol-series polarizing membrane usually comprises a polyvinyl alcohol-series resin film and a dichroic material (e.g., iodine, and a dichroic dye). The polyvinyl alcohol-series resin may be a saponified product of a polyvinyl acetate, a saponified product of a copolymer of vinyl acetate and a small amount of a copolymerizable monomer (e.g., an unsaturated carboxylic acid, an unsaturated sulfonic acid, and a cationic monomer), a derivative of the saponified product (e.g., a formalized product, and an acetalized product). Specifically, as the polyvinyl alcohol-series resin, there may be mentioned a polyvinyl alcohol, a polyvinyl acetal, a polyvinyl butyral, and others. The average degree of polymerization of the polyvinyl alcohol-series resin may be, for example, about 1000 to 10000, preferably about 2000 to 7000, and more preferably about 3000 to 5000. Moreover, the degree of saponification of the polyvinyl alcohol-series resin is not less than 85% by mole, preferably not less than 90% by mole (e.g., about 90 to 100% by mole), and more preferably not less than 95% by mole (e.g., about 98 to 100% by mole).

The polarizing membrane may be obtained by applying a swelling treatment, a dyeing treatment with a dichroic material, a crosslinking treatment, a drawing treatment (a uniaxially drawing treatment in a drawing ratio of about 3 to 7) or others to the polyvinyl alcohol-series resin film. The thickness of the polarizing membrane may be, for example, about 5 to 100 μm (e.g., about 10 to 80 μm). The surface of the polarizing membrane may be subjected to various surface treatments (e.g., a corona discharge treatment, a plasma treatment, and an anchor coating treatment) in order to improve the adhesiveness.

The protective film may be usually laminated on a polarizing membrane through an adhesive layer. That is, the polarizing sheet layer may comprise a polarizing membrane, and the protective film (the protective film for the polarizing membrane) laminated on at least one side of the polarizing membrane though an adhesive layer.

The adhesive (or pressure sensitive adhesive) for forming the adhesive layer is not particularly limited to a specific one. The adhesive may include a conventional adhesive, for example, an acrylic adhesive, a urethane-series adhesive, and an epoxy-series adhesive. Any adhesive may be used as far as the adhesive is enough to bond the polarizing membrane to the protective film. Moreover, the adhesive layer may contain various additives, for example, a stabilizer (e.g., a heat stabilizer, an ultraviolet ray absorbing agent, and an antioxidant), a plasticizer, a coloring agent, a flame retardant, an antistatic agent, and a viscosity adjustment (or viscosity controller). The thickness of the adhesive layer may be selected, for example, from the range of about 0.1 to 80 μm in terms of solid content. The thickness of the adhesive layer may be usually about 1 to 60 μm, preferably about 2 to 50 μm, and more preferably about 5 to 40 μm.

The polarizing sheet having the adhesive layer may be produced by laminating the protective film on one or both side(s) of the polarizing membrane with the adhesive. In this process, the protective films are pasted (or bonded) on both sides of the polarizing membrane (polarizing film or sheet), respectively, in many cases. After the polarizing membrane and the protective film are bonded with the adhesive, the resulting sheet may be subjected to an aging treatment at a suitable temperature (e.g., about 30 to 70° C.).

Incidentally, in order to adjust the coatability, the adhesive may contain an organic solvent, for example, a hydrocarbon (e.g., an aliphatic hydrocarbon such as hexane, an alicyclic hydrocarbon such as cyclohexane, and an aromatic hydrocarbon such as toluene), a halogenated hydrocarbon, an ester (e.g., ethyl acetate), a ketone (e.g., acetone, methyl ethyl ketone, and methyl isobutyl ketone), and an ether (e.g., dioxane, and tetrahydrofuran). The ether may be an alkylene glycol dialkyl ether such as ethylene glycol diethyl ether, an alkylene glycol alkyl ether acetate such as ethylene glycol monoethyl ether monoacetate, and others. The organic solvents may be used singly or in combination.

The polarizing sheet may be molded (or shaped) by being subjected to various processes. In particular, for optical member application such as sunglasses, the polarizing sheet is produced by being shaped through the use of a bending [for example, by being shaped into a curved surface (e.g., a convex surface, or a spherical surface (having a convex surface as one side and a concave surface as the other side))] in many cases. In usual, a protective film comprising the polyamide resin (or the polarizing plate comprising the protective film) subjected to such a bending has light leakage [or cruciform light leakage, a brighten cruciform mark or one or several brighten mark(s) appearing on the protective film (e.g., brighten marks appearing on four corners thereof)] probably because the birefringence index of the protective film is increased.

In the present invention, the protective film ensures prevention or inhibition of light leakage generation (and irregular color development) even in the case of being subjected to a bending [for example, a curved surface processing (particularly, a curved surface processing with a thermoforming)]. Accordingly, the present invention also includes, for example, a method for preventing or inhibiting light leakage (and development or generation of irregular color) of a protective film for a polarizing membrane (or a polarizing sheet) [specifically, light leakage (and irregular color) generated in the protective film or polarizing sheet (or the protective film or polarizing sheet after bending)], wherein the method comprises providing a protective film comprising a polyamide resin, and adjusting a retardation value of the film to not less than 300 nm.

Thus, the polarizing sheet may be a curved polarizing sheet [or a polarizing sheet subjected to a bending (a convex forming)].

In the curved polarizing sheet, the radius of curvature is not particularly limited to a specific one. The radius of curvature may be usually about 20 to 140 mm, preferably about 40 to 120 mm, and more preferably about 60 to 100 mm. The present invention ensures to mold a polarizing sheet at such a curvature without light leakage generation.

Incidentally, as described above, the retardation value of the protective film is increased in some degree by a bending. Such a retardation value increased by a bending [or the difference (R2−R1) between the retardation value (R2) of the protective film after forming (or deformation), and the retardation value (R1) of the protective film before forming (or deformation)] may be selected from the range of about 50 to 400 nm (e.g., about 50 to 350 nm) depending on the degree of bending, and for example, may be about 60 to 300 nm (e.g., about 70 to 270 nm), preferably about 80 to 250 nm (e.g., about 90 to 230 nm), and more preferably about 100 to 200 nm.

That is, in the curved polarizing sheet, the retardation value of a protective film having the corresponding curved surface (a protective film subjected to a bending, a protective film after bending, or a protective film of a polarizing sheet after bending) is represented as the sum of the retardation value of the protective film and the retardation value increased by a bending (e.g., about 50 to 400 nm). Specifically, the retardation value of the curved protective film may be, for example, selected from the range of not less than 400 nm (e.g., about 420 to 20400 nm). The retardation value of the protective film may be usually not less than 450 nm (e.g., about 470 to 15300 nm), for example, not less than 480 nm (e.g., about 490 to 10200 nm), preferably not less than 500 nm (e.g., about 520 to 7100 nm), more preferably not less than 550 nm (e.g., about 580 to 6100 nm), and particularly not less than 600 nm (e.g., about 650 to 5100 nm).

In particular, the retardation value of the curved protective film may be, for example, not more than 5100 nm (e.g., about 400 to 4900 nm), preferably not more than 4600 nm (e.g., about 450 to 4300 nm), more preferably not more than 4100 nm (e.g., about 500 to 3600 nm), particularly not more than 3100 nm (e.g., about 600 to 2600 nm), and usually not more than 2100 nm (e.g., about 700 to 1600 nm), and preferably about 900 to 1400 nm).

The curved polarizing sheet may be obtained by laminating the protective film on at least one side (particularly, both sides) of the polarizing membrane (usually, with an adhesive), and subjecting the laminate to a bending (particularly, a bending with a thermoforming). The bending (a curved surface processing) may be usually carried out with a thermoforming. The thermoforming method is not particularly limited to a specific one, and may include a simple-curved surface molding, a multi-curved surface molding (e.g., a vacuum molding, a free blow molding, a pneumatic molding, and a heat press molding), and others. The particularly preferred thermoforming method is a vacuum molding. The thermoforming temperature is usually 40 to 50° C. lower than the glass transition temperature (Tg) of the polyamide resin constituting the protective film. For example, the thermoforming temperature is usually about 90° C. to (Tg+20)° C. in many cases, and may be, for example, not lower than 90° C. (e.g., about 90 to 200° C.), preferably about 100 to 190° C., and more preferably about 110 to 160° C.

Moreover, in the polarizing sheet (or polarizing laminate) of the present invention, since the protective film comprises a polyamide resin, the polarizing sheet (or polarizing laminate) has no cracks or breaking even in the case of being subjected to other shaping process, for example, a punching process, and a drilling (or punching or boring) process, and has a high moldability. Therefore, the polarizing sheet may be a polarizing sheet further subjected to the punching process or the drilling process in addition to the bending.

Moreover, the polarizing sheet of the present invention may constitute a polarizing laminate. It is sufficient that the polarizing laminate comprises the polarizing sheet at least comprising a polarizing membrane and the protective film. The polarizing laminate may comprise the polarizing sheet singly, or may comprise a composite laminate having a thermoforming resin layer thermally adhered to at least one protective film of the polarizing laminate. The thermoforming resin layer may be formed on both sides of the protective film, or on one side thereof. In the case of molding or forming the thermoforming resin layer on one side of the protective film, the thermoforming resin layer may be usually formed on the emitted-light side (the side near to eyes, the inside) of the protective film.

The resin constituting the resin layer may include various thermoforming (or thermoformable) thermoplastic resins, for example, an olefinic resin (e.g., a polypropylene, and a poly (4-methylpentene-1)), a styrenic resin (e.g., a polystyrene, an acrylonitrile-styrene copolymer, and a styrene-methyl methacrylate copolymer), an acrylic resin (e.g., a poly(methyl methacrylate), and a methyl methacrylate-styrene copolymer), a polyester-series resin (e.g., a homo- or copolyester having an alkylene arylate unit, or an aromatic polyester-series resin), a polyamide-series resin, a polycarbonate-series resin (e.g., a bisphenol-based (e.g., a bisphenol A-based) polycarbonate-series resin), a thermoplastic polyurethane-series resin, and a resin having a bridged hydrocarbon ring (e.g., an adamantane ring, a norbornane ring, and a cyclopentane ring) (for example, trade name ARTON™ manufactured by JSR Corporation, trade name ZEONEX™ manufactured by Zeon Corporation, and trade name APEL™ manufactured by Mitsui Chemicals, Inc.). Moreover, as the thermoplastic resin, an acylcellulose (e.g., a cellulose triacetate, a cellulose diacetate, a cellulose acetate propionate, and a cellulose acetate butyrate) may be used. The acylcellulose may be plasticized with a plasticizer, or may be an internal-plasticized acylcellulose such as a cellulose acetate propionate or a cellulose acetate butyrate.

These resins are preferably optically isotopic and transparent in the case of using the laminate for optical application. Moreover, as these resins, a resin having a small birefringence is preferred. Such a resin is usually amorphous or noncrystalline in many cases. Moreover, as such a resin, a resin having a high impact resistance is also preferred. The resin having these properties may include, for example, the above-exemplified polyamide resin (particularly, an alicyclic polyamide resin), the above-exemplified polycarbonate-series resin, the above-exemplified thermoplastic polyurethane-series resin, and the above-exemplified acylcellulose. Moreover, the resin constituting the resin layer may be the same series or same with the resin constituting the above-mentioned protective film. For example, the resin may be a polyamide resin such as the above-mentioned alicyclic polyamide resin.

The resin layer may contain various additives, for example, a stabilizer (e.g., a heat stabilizer, an ultraviolet ray absorbing agent, and an antioxidant), a plasticizer, a lubricant, a filler, a coloring agent, a flame retardant, and an antistatic agent.

The thickness of the resin layer is not particularly limited to a specific one. For example, the thickness of the resin layer may be selected from the range of about 0.1 to 5 mm, and usually may be about 0.5 to 3 mm (e.g., about 0.5 to 2 mm). The resin layer may have a uniform thickness overall, or may have a continuously increasing or continuously decreasing thickness from the central part toward the peripheral part. Also in the polarizing laminate having such a thickness distribution, the average thickness of the resin layer may be selected from the similar range as mentioned above, and may be usually about 0.5 to 3 mm.

The resin layer may be formed by various thermoforming methods, for example, a compression molding, a transfer molding, an injection molding, and an injection compression molding. The resin layer is formed by an injection molding (that is, an insert injection molding) or an injection compression molding in many cases. The insert injection molding may be conducted by disposing the polarizing sheet (particularly, a curved polarizing sheet) to a predetermined position of a mold, and injection-molding a molten resin for the resin layer or a composition of the resin into the mold. Incidentally, in the case of the curved polarizing sheet, the resin may be injection-molded to one side of the polarizing sheet, or a curved polarizing laminate may be obtained by injection-molding the resin to both sides of the polarizing laminate. For example, in the curved polarizing laminate (e.g., a spherical surface shape), the resin may be injection-molded to the convex surface and/or concave surface. The resin is usually injection-molded to the concave surface in many cases. Incidentally, the injection molding may be carried out by a conventional manner. For example, depending on the kind of the resin, the molding may be conducted by injecting a thermoplastic resin melt-kneaded at a temperature of about 200 to 350° C. (preferably about 250 to 330° C.) under a pressure of about 50 to 200 MPa. Moreover, a molded product obtained by the injection molding may be annealed. In the case of utilizing the injection compression molding, a polarizing laminate having a high accuracy of dimension can be obtained by injecting a molten resin into a mold and then applying a compressive force to the resin inside the mold.

Incidentally, if necessary, various treatments may be applied to one side of the polarizing laminate (as mentioned above, one protective film in the case of forming a resin layer on the other protective film of the polarizing sheet). These treatments may include, for example, a hardcoat treatment, an antireflection treatment, a defogging treatment, a soil-resistant (or antifouling) treatment, and a mirror finish treatment. The plurality of these treatments may be applied in combination.

The hardcoat treatment may be carried out by coating the surface of the polarizing laminate with a thermosetting resin [for example, a silicone compound (e.g., an alkoxysilane or a partially hydrolyzed condensation product thereof), and an epoxy-series thermosetting resin], a photo-curing resin or an ultraviolet-curing resin (e.g., an acrylic photo-curing resin, and an epoxy-series photo-curing resin), and curing (thermosetting or photocuring) the resin. The thickness of the hardcoat layer obtained by the hardcoat treatment may be, for example, about 1.0 to 10 μm, preferably about 2 to 8 μm, and more preferably about 3 to 6 μm.

The antireflection treatment may be conducted by forming a plurality of inorganic layers or organic layers with different refractive indices through the use of deposition, coating or other means. The inorganic layer may include, for example, an inorganic oxide layer such as a zirconium oxide (e.g., $ZrO_2$), a silicon oxide (e.g., $SiO_2$), an aluminum oxide (e.g., $Al_2O_3$), and a titanium oxide (e.g., $TiO_2$).

Moreover, the defogging treatment may be carried out by coating the surface of the polarizing laminate with a hydrophilic resin. The soil-resistant treatment may be conducted by coating the surface of the polarizing laminate with a material having a low surface tension (e.g., a silicone-series or fluorine-series material). Further, the mirror finish treatment may be carried out by forming a metallic reflection membrane (e.g., an aluminum membrane) by deposition.

INDUSTRIAL APPLICABILITY

Since the protective film (and the polarizing sheet) of the present invention comprises a polyamide resin and has a specific retardation value, in the protective film light leakage generation or development and irregular color development can be efficiently prevented even in the case where the film is subjected to a bending. Moreover, the protective film comprising the polyamide resin is excellent in design and in moldability or mechanical properties (e.g., mechanical strength). For example, the protective film can be molded without braking or cracks even in the case of being subjected to a punching process, a drilling process, or others. Further, the protective film comprising the polyamide resin (particular, an alicyclic polyamide resin) is excellent in chemical resistance. For example, the protective film does not generate cracks and the like even in the case of being into contact with a flame containing a plasticizer, or others, and is high in durability.

Therefore, the protective film (and the polarizing sheet) of the present invention is useful in a base material for an eyeglass, for example, an optical base material (or optical member) for sunglasses (containing sunglasses with a degree) or goggles. In particular, the protective film (or the polarizing sheet) of the present invention comprises a polyamide resin (an amorphous or crystalline polyamide resin, particularly, an alicyclic polyamide resin having microcrystallinity), is excellent in moldability, and further does not develop light leakage (and irregular color) even in the case of being subjected to a bending. Accordingly, the protective film is useful in a base material for a lens (a polarizing lens) of glasses (e.g., frameless glasses).

EXAMPLES

Hereinafter, the following examples are intended to describe this invention in further detail and should by no means be interpreted as defining the scope of the invention.

Incidentally, resins used in examples and comparative examples are shown below. Moreover, properties or characteristics of a protective film before and after molding are measured (or evaluated) by the following method (or the following criteria).

[Resin]

TROGAMID CX7323: manufactured by Daicel-Degussa Ltd., an alicyclic polyamide resin, average Abbe number: 45, glass transition temperature: 140° C. (a product dried by a tray dryer at 90° C. for 3 hours)

GRILAMID TR55: manufactured by EMS-Chemie Holdings AG (Switzerland), an alicyclic polyamide resin, Abbe number: 42, glass transition temperature: 160° C. (a product dried by a tray dryer at 90° C. for 3 hours)

Polycarbonate resin: manufactured by Idemitsu Petrochemical Co., Ltd., average degree of polymerization: 80, Abbe number: 29, glass transition temperature: 145° C. (a product dried at 120 to 125° C. for 3 hours)

[Retardation Value]

With respect to each protective film obtained in the examples and comparative examples, the retardation value (the retardation value of the protective film before bending) and the retardation value of the protective film after bending (the retardation value of the protective film in a curved polarizing sheet) were measured by an automatic birefringence analyzer (manufactured by Oji Scientific Instruments, trade name "KOBRA-21DH").

[Bending Processability]

The bending processability of each protective film obtained in the examples and comparative examples (protective film or polarizing sheet before bending) was evaluated on the basis of the following criteria.

"A": The film (or sheet) could be bent to almost exactly trace (or reflect) a mold curvature.

"B": There are some differences in bending degree between the molded polarizing sheet and a mold curvature because the bending degree of the orientation direction is not completely the same from that of the perpendicular direction thereto in the protective film.

[Light Leakage Test]

With respect to each protective film obtained in the examples and comparative examples, one side of the protective film was coated with an appropriate amount of an acrylic pressure sensitive adhesive "SAIVINOLAT-250 (manufactured by Saiden Chemical Industry Co., Ltd.). Each protective film was adhered to each side of a polyvinyl alcohol-series polarizing film having a thickness of about 40 μm (manufactured by Polatechno Co., Ltd.), and a polarizing sheet (polarizing plate) was molded. The obtained polarizing plate was cut out into a predetermined shape (a shape in which a pair of opposed sides of an almost quadrilateral was outward curved in an almost circular arc form) with a Thomson cutter. The cut-out polarizing plate was put into a far-infrared ray furnace at a predetermined temperature [a temperature which was not lower than 90° C. and was a temperature not higher than a glass transition temperature of a resin constituting each protective film plus 20° C.], and pre-heated for 1 to 2 minutes. Thereafter, the pre-heated polarizing plate was put on a concave mold having a radius of curvature of 87 mm adjusted to the predetermined temperature, and subjected to a vacuum suction from a suction opening provided at the bottom of the mold to give a curved polarizing sheet (a curved polarizing plate). A light (linearly polarized light) was applied to the obtained polarizing plate from the convex surface direction thereof through other polarizing plate (a planate polarizing plate, manufactured by Rennes Japan, trade name "k-hs200"). By visual observation from the concave surface direction of the polarizing plate, the light leakage was evaluated on the basis of the following criteria.

"A": light leakage was not observed.

"B": Extremely slight light leakage was observed.

"C": light leakage was observed.

[Chromatic Aberration Test]

The curved polarizing plate or polarizing sheet (the bent polarizing plate) was disposed on a concave lens mold set up on an injection molding machine. The mold was closed, and then a molding resin for lens (the same resin as the resin constituting the protective film) was injected to mold a polarizing laminate (a polarizing lens). The convex surface of the obtained polarizing lens was visually observed obliquely, and the irregular color was evaluated on the basis of the following criteria.

"A": Chromatic aberration was not observed.
"B": Chromatic aberration was observed.

Examples 1 to 6 and Examples 8 to 10, and Comparative Examples 2 to 3

A protective film for a polarizing membrane was molded by the following off-line molding process.

A resin shown in Table 1 was heat-melted, and the molten resin was extruded from a T-die with a φ40 mm uniaxial extruder, cooled with a chill roll, and then rolled up by a winder. The rolled up sheet was guided to a vertically drawing machine equipped with four rolls each independently having a rotational frequency and a temperature, and uniaxially drawn at a draw ratio shown in Table 1 with heating to a temperature slightly higher than the glass transition temperature of the resin (e.g., with heating to about 140 to 180° C.) to give a protective film for a polarizing membrane. By using the obtained protective film, the retardation value was measured in accordance with the above-mentioned method. Moreover, the obtained protective film was used to produce a polarizing sheet (or polarizing plate) by the above-mentioned method. The sheet (or plate) was subjected to a bending, and the retardation value thereof was measured based on the above-mentioned method and evaluated about light leakage. Further, a polarizing laminate was produced from the polarizing sheet (polarizing plate) by the above-mentioned method, and the irregular color of the laminate was evaluated.

Example 7

A protective film for a polarizing membrane was molded by the following in-line molding process.

A resin shown in Table 1 was heat-melted with a φ40 mm uniaxial extruder. The molted resin was extruded on a chill roll from a T-die, cooled for solidification, guided to a vertically drawing machine equipped with four rolls each independently having a rotational frequency and a temperature, and uniaxially drawn at a draw ratio shown in Table 1 with heating to a temperature slightly higher than a glass transition temperature of the resin to give a protective film for a polarizing membrane. By using the obtained protective film, the retardation value was measured in accordance with the above-mentioned method. Moreover, the obtained protective film was used to produce a polarizing sheet (or polarizing plate) by the above-mentioned method. The sheet (or plate) was subjected to a bending, and the retardation value thereof was measured based on the above-mentioned method and evaluated about light leakage. Further, a polarizing laminate was produced from the polarizing sheet (polarizing plate) by the above-mentioned method, and the irregular color of the laminate was evaluated.

Comparative Example 1

A resin shown in Table 1 was heat-melted, and the molten resin was extruded on a chill roll from a T-die with a φ40 mm uniaxial extruder, cooled for solidification, and rolled up without drawing to give a protective film for a polarizing membrane. By using the obtained protective film, the retardation value was measured in accordance with the above-mentioned method. Moreover, the obtained protective film was used to produce a polarizing sheet (or polarizing plate) by the above-mentioned method. The sheet (or plate) was subjected to a bending, and the retardation value thereof was measured based on the above-mentioned method and evaluated about light leakage. Further, a polarizing laminate was produced from the polarizing sheet (polarizing plate) by the above-mentioned method, and the irregular color of the laminate was evaluated.

The results are shown in Table 1.

TABLE 1

| | Resin | Thickness before drawing (mm) | Thickness after drawing (mm) | Molding | Draw ratio | Retardation (nm) |
|---|---|---|---|---|---|---|
| Ex. 1 | CX7323 | 0.4 | 0.25 | Off-line | 2.5 | 4567 |
| Ex. 2 | TR55 | 0.4 | 0.28 | Off-line | 2.0 | 3800 |
| Ex. 3 | CX7323 | 0.4 | 0.28 | Off-line | 2.0 | 3690 |
| Ex. 4 | CX7323 | 0.4 | 0.28 | Off-line | 2.0 | 3469 |
| Ex. 5 | TR55 | 0.4 | 0.33 | Off-line | 1.5 | 2350 |
| Ex. 6 | CX7323 | 0.4 | 0.33 | Off-line | 1.5 | 2268 |
| Ex. 7 | TR55 | 0.4 | 0.35 | In-line | 1.2 | 950 |
| Ex. 8 | CX7323 | 0.4 | 0.37 | Off-line | 1.15 | 713 |
| Ex. 9 | CX7323 | 0.4 | 0.39 | Off-line | 1.06 | 310 |
| Ex. 10 | CX7323 | 0.4 | 0.2 | Off-line | 3 | 5050 |
| Com. Ex. 1 | CX7323 | 0.4 | 0.4 | — | 1.00 | 11 |
| Com. Ex. 2 | Polycarbonate | 0.4 | 0.33 | Off-line | 1.5 | 4300 |
| Com. Ex. 3 | Polycarbonate | 0.4 | 0.39 | Off-line | 1.03 | 180 |

| | Bending processability | Retardation after bending (nm) | Light leakage test | Molding resin for lens | Irregular color test |
|---|---|---|---|---|---|
| Ex. 1 | A | 4700 | A | CX7323 | A |
| Ex. 2 | A | 3900 | A | TR55 | A |
| Ex. 3 | A | 3800 | A | CX7323 | A |
| Ex. 4 | A | 3600 | A | CX7323 | A |
| Ex. 5 | A | 2500 | A | TR55 | A |
| Ex. 6 | A | 2550 | B | CX7323 | A |
| Ex. 7 | A | 1100 | A | TR55 | A |
| Ex. 8 | A | 910 | B | CX7323 | A |
| EX. 9 | A | 530 | A | CX7323 | A |

TABLE 1-continued

| Ex. 10 | B | 5100 | A | CX7323 | A |
| Com. Ex. 1 | A | 220 | C | CX7323 | A |
| Com. Ex. 2 | A | 4400 | A | Polycarbonate | B |
| Com. Ex. 3 | A | 380 | C | Polycarbonate | B |

The invention claimed is:

1. A polarizing curved sheet comprising:
a polyvinyl alcohol-series polarizing membrane, and
a protective film for the polarizing membrane, which is laminated on at least one side of the polarizing membrane, wherein said protective film comprises a polyamide resin and has a retardation value of 500 nm to 2500 nm,
wherein the protective film is an uniaxially oriented film having the draw ratio of 1.05 to 2.8,
the polyamide resin comprises an alicyclic polyamide resin, wherein monomers of the alicyclic polyamide resin comprise a bis(aminoC$_{5-10}$cycloalkyl)C$_{1-6}$alkane and a C$_{4-18}$alkane dicarboxylic acid and the retardation value is defined as $\Delta n \cdot d$, wherein "$\Delta n$" represents a difference in refractive index between a drawn direction of the film and a direction perpendicular thereto, and "d" represents a thickness of the film.

2. The polarizing curved sheet according to claim 1, wherein the polyamide resin comprises a microcrystalline polyamide resin.

3. The polarizing curved sheet according to claim 1, wherein the polyamide resin has an Abbe number of 40 to 60.

4. The polarizing curved sheet according to claim 1, which has a retardation value of 600 nm to 2600 nm.

5. A process for producing the polarizing curved sheet recited in claim 1, which comprises subjecting a film comprising a polyamide resin to an orientation, wherein the orientation comprises an uniaxially drawing of a molten film comprising the polyamide resin at a draw ratio of 1.05 to 2.8.

6. A method for preventing or inhibiting generation of light leakage of a polarizing curved sheet, wherein the polarizing curved sheet comprises a polyvinyl alcohol-series polarizing membrane and a protective film comprising a polyamide resin laminated on at least one side of the polarizing membrane, said method comprising,
providing the protective film, and
adjusting a retardation value of the protective film to 500 nm to 2500 nm, wherein the protective film is an uniaxially oriented film having a draw ratio of 1.05 to 2.8, the polyamide resin comprises an alicyclic polyamide resin, wherein monomers of the alicyclic polyamide resin comprise a bis(aminoC$_{5-10}$cycloalkyl)C$_{1-6}$alkane and a C$_{4-18}$alkane dicarboxylic acid, and the retardation value is defined as $\Delta n \cdot d$, wherein "$\Delta n$" represents a difference in refractive index between a drawn direction of the protective film and a direction perpendicular thereto, and "d" represents a thickness of the protective film.

7. The polarizing curved sheet according to claim 1, wherein the protective film is curved corresponding to the curved surface of the polarizing sheet, and has a retardation value of 600 nm to 2600 nm.

8. A process for producing the polarizing curved sheet recited in claim 1, which comprises laminating the protective film on at least one side of the polarizing membrane, and bending the laminate with a thermoforming method.

* * * * *